United States Patent [19]
Mitrani

[11] 3,948,531

[45] Apr. 6, 1976

[54] BULKHEAD SEAL

[75] Inventor: Joseph W. Mitrani, Glenview, Ill.

[73] Assignee: Crane Packing Company, Morton Grove, Ill.

[22] Filed: Apr. 24, 1975

[21] Appl. No.: 571,286

[52] U.S. Cl. .................................. 277/9; 277/137
[51] Int. Cl.² ............................................ F16J 9/00
[58] Field of Search .............. 277/9, 9.5, 11, 137, 4

[56] References Cited
UNITED STATES PATENTS

| | | | |
|---|---|---|---|
| 2,071,914 | 2/1937 | Bentley | 277/137 X |
| 2,867,458 | 1/1959 | Kroerel | 277/137 |

*Primary Examiner*—Samuel B. Rothberg
*Attorney, Agent, or Firm*—Charles F. Voytech

[57] ABSTRACT

A segmented packing for a ship's propeller shaft at a bulkhead in the ship's hold to prevent water in one ship's compartment from passing through the propeller shaft opening in a bulkhead to an adjacent compartment. The seal is normally held out of contact with the propeller shaft by equally spaced pins. The pins have grooves into which the seal segments are forced by encircling garter springs when the pins are normally pushed axially to apply the packing. The pins can be pushed from either side of the bulkhead so that the operator need not enter the flooded compartment to make the packing effective. The packing can be cocked again after use by operating a threaded jack for each segment and then retracting the pins to their initial position in which the packing is held out of contact with the shaft.

14 Claims, 8 Drawing Figures

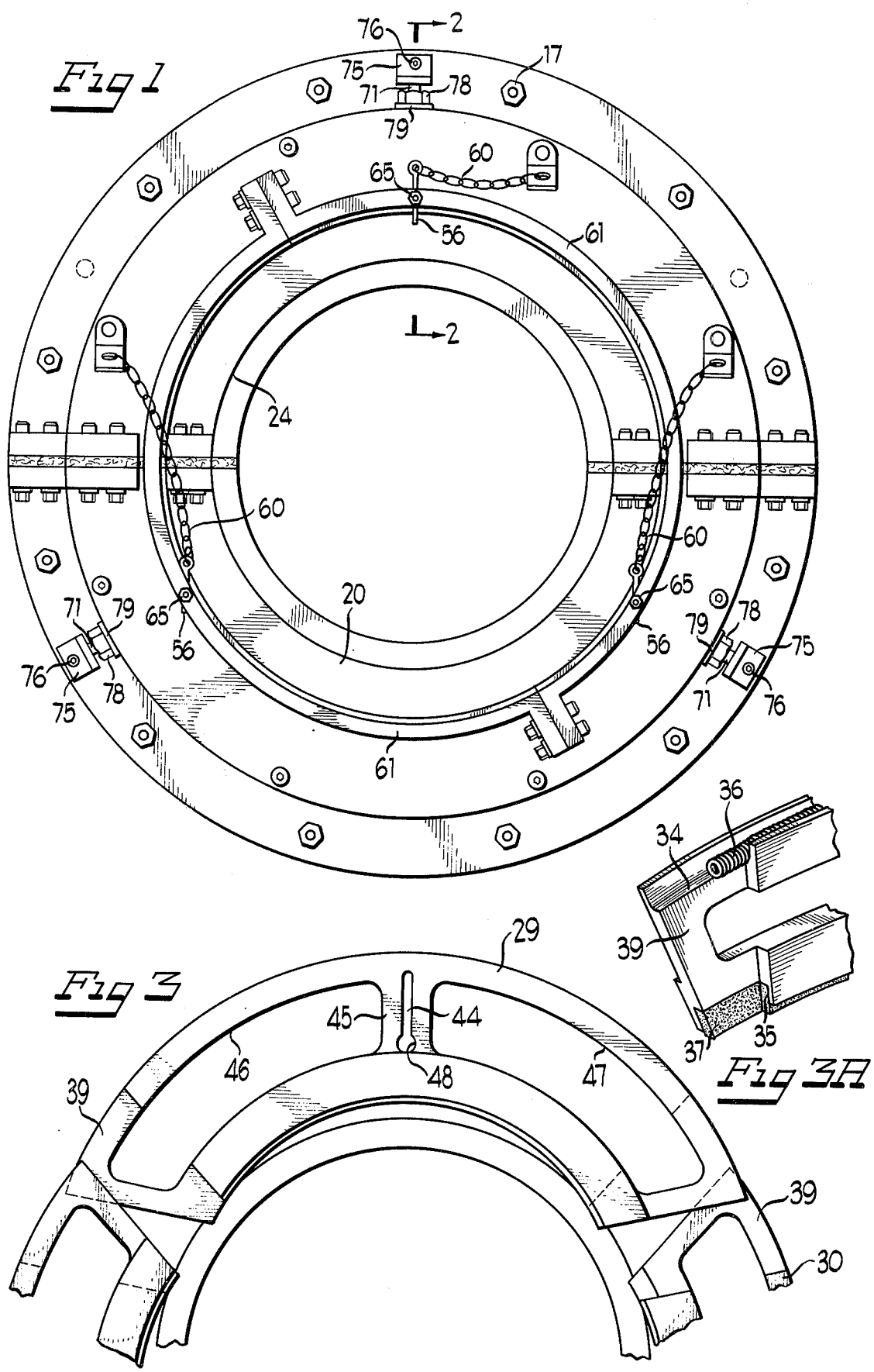

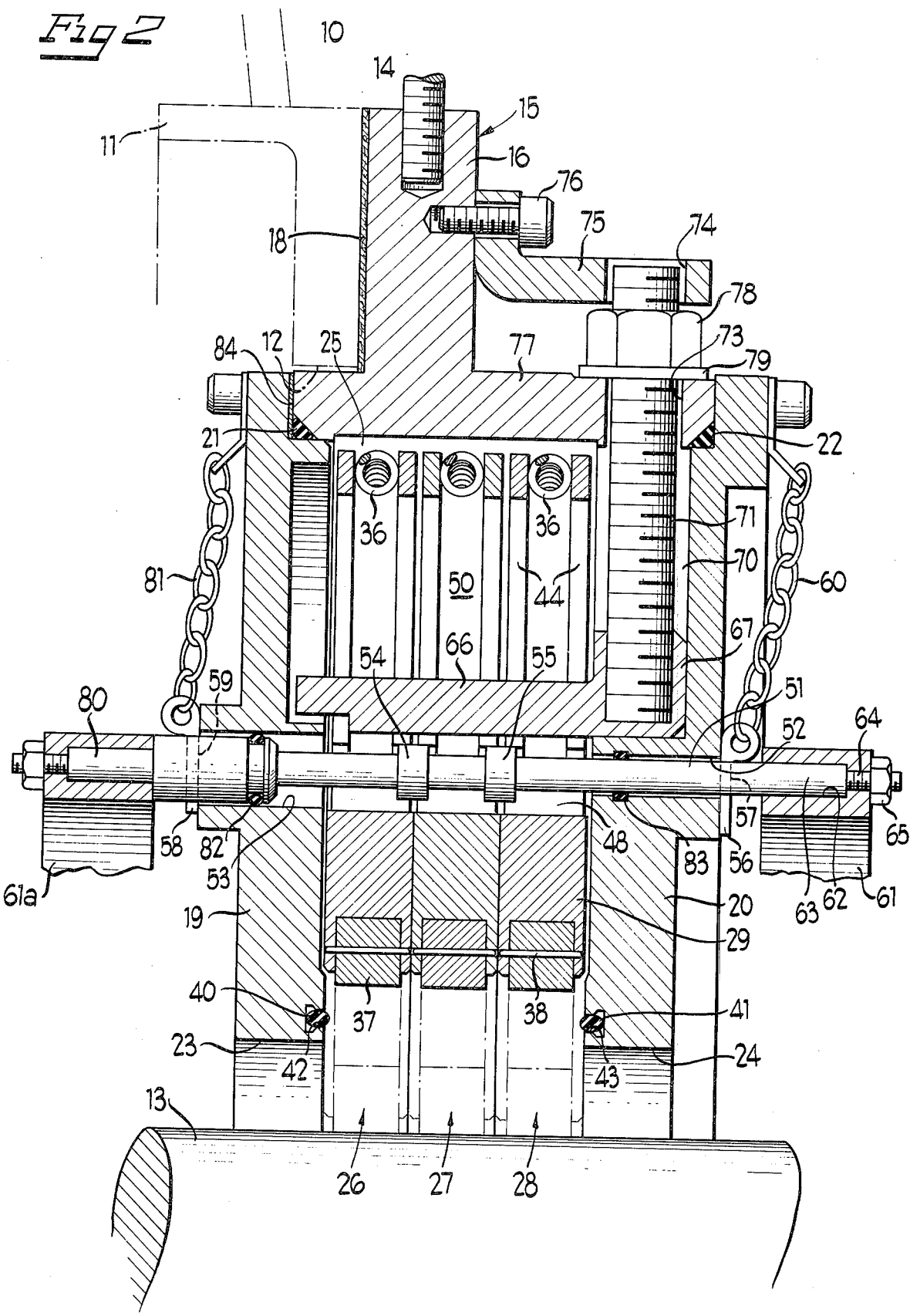

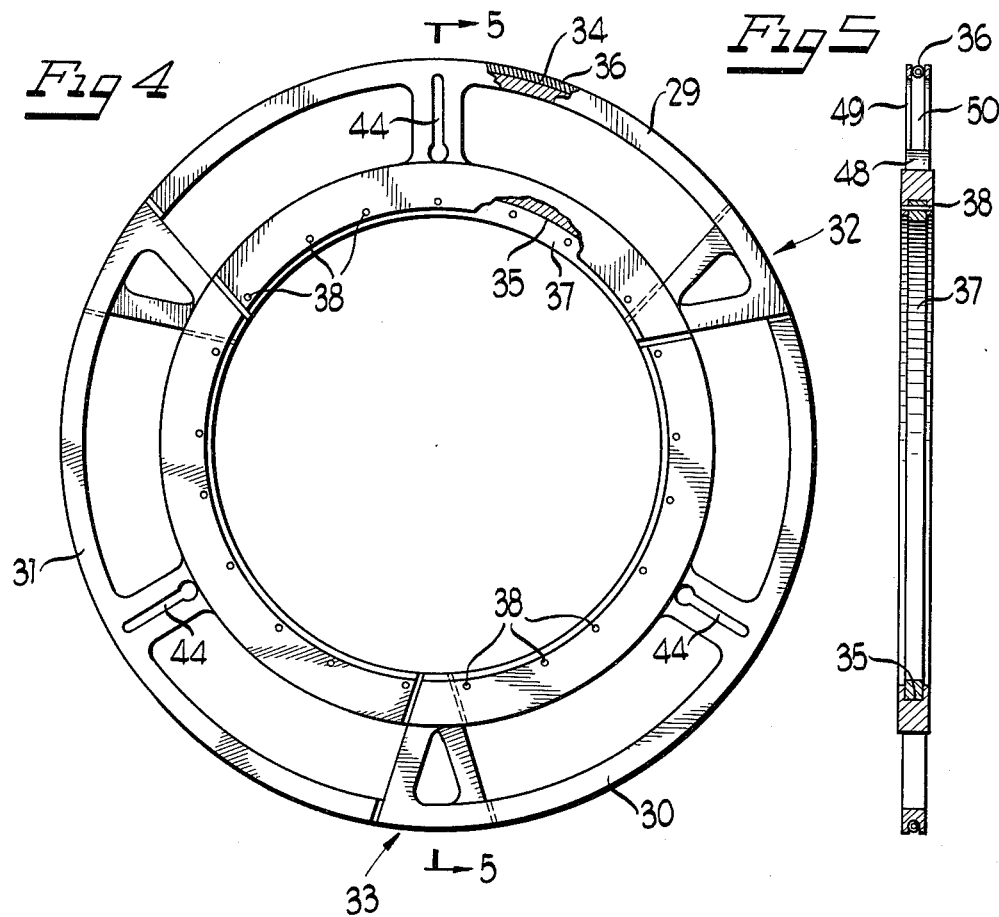
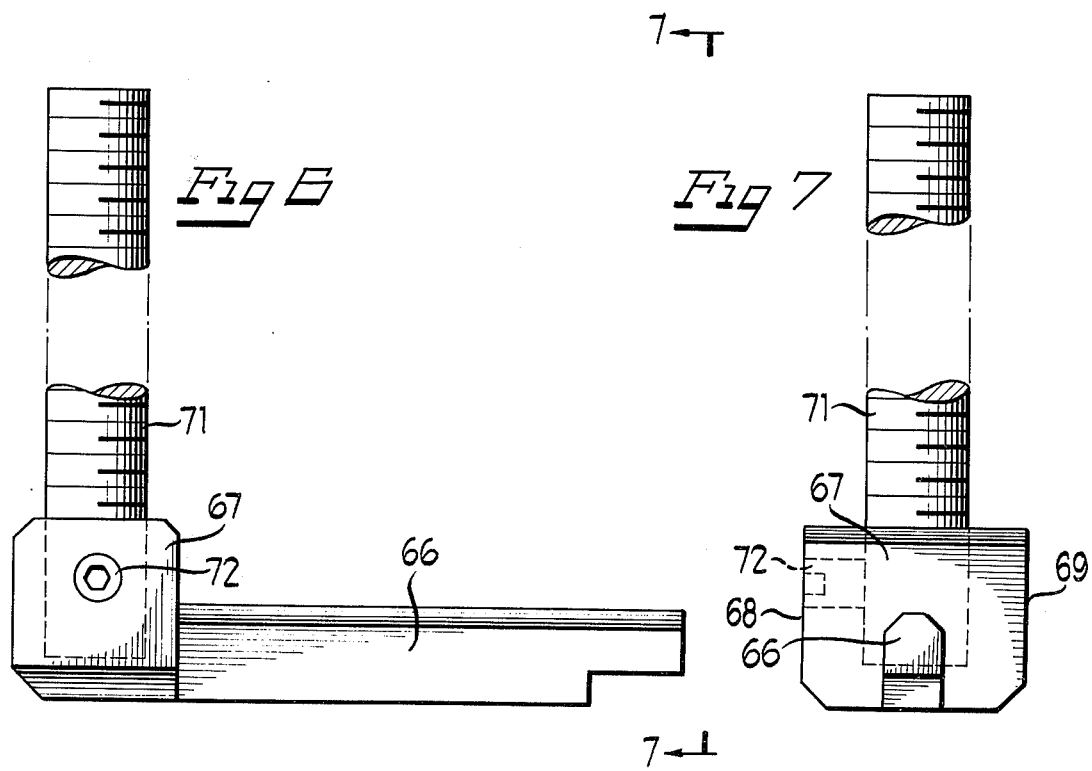

BULKHEAD SEAL

This invention relates to a seal using segmented packing and particularly to a seal the position of the packing of which relative to the element to be sealed can be controlled.

Ships which are subject to hull damage by explosives or exposure to severe weather conditions are partitioned by bulkheads into a series of compartments which are made water-tight to limit the volume of the hull subject to flooding when a particular area is ruptured. In the aft section of a ship between the engines and the propeller, the partitions are traversed by the propeller shaft so that the bulkheads cannot be effective to seal off a flooded compartment from the remainder of the ship unless a seal can be effected between the bulkhead and propeller shaft. The seal, however, is not needed except when a compartment is flooded, and hence the seal should be normally out of contact with the shaft to avoid useless wear, but should be capable of instant operation when needed. Furthermore, the seal should be capable of being put into instant operation by means built into the seal which are available from either side of the bulkhead since it cannot be anticipated which side of the bulkhead will be flooded. Lastly, the seal, once made operative, should be capable of restoration to its out-of-contact condition in readiness for the next emergency.

It is, accordingly, an object of this invention to provide a segmental packing for a ship's propeller at a bulkhead, wherein the segments are normally held out of contact with the shaft, but which can be instantly released to contract operatively around the shaft when needed.

Another object of this invention is to provide a packing which may be held out of operative contact with a shaft until needed, with manually operated trigger means for releasing the packing for operative contact with a shaft, and with further means for withdrawing the packing from the shaft and holding it in readiness for the next use.

A more specific object of this invention is the provision of a segmental packing with means for normally holding the segments out of contact with a shaft, and with trigger means operable from either side of the packing to release said segments instantly for contact with the shaft.

Another specific object is to provide a segmental packing that has means for normally holding the segments out of contact with a shaft and trigger means operable from either side of the packing to rlease said segments instantly for contact with a shaft, with locking means for preventing the trigger means from inadvertently being operated to release the packing.

These and other objects of this invention will become apparent from the following detailed description of a preferred embodiment of the invention when taken together with the accompanying drawings, in which:

FIG. 1 is a front elevational view of a seal incorporating the split packing, segment holding devices, trigger release mechanism and segment restoring means of this invention;

FIG. 2 is an enlarged fragmentary quarter section of the seal taken along line 2—2 of FIG. 1;

FIG. 3 is a fragmentary elevation of a segment of a packing and the overlapping ends of adjacent segments;

FIG. 3A is a perspective view of the end fragment of a segmental packing.

FIG. 4 is an elevational view of one ring of segmental packing and FIG. 5 is a diametral cross section therethrough taken along line 5—5 of FIG. 4; and FIGS. 6 and 7 are, respectively, side and end elevational views of the packing restoration mechanism.

In its preferred form as illustrated herrein the bulkhead seal of this invention comprises a split housing designed to fit around a propeller shaft and to be assembled therearound and into an opening in a bulkhead for said shaft. Within the housing are three sets of split packing, each set being identical with the other sets and comprising three metal segments with overlapping ends and an internal groove. The metal segments serve as holders for the packing and hence in the groove is fastened a square section segment of an essentially asbestos packing, the packing segment being held in its groove by pins passing through the sides of the groove and through the packing. A garter spring is stretched around the three metal segments in a set to urge them radially upwardly against the shaft.

Normally, however, the three metal segments of a set are held in radially spaced relation with the shaft by axially disposed pins passing through keyhole slots formed in the segments, there being one pin for each segment. The pins have two diameters, one for the round end of the keyhole slot and a smaller one for the remainder of the slot. The pins are held against axial movement in the slots by keys engaging the pins on opposite sides of the housing, but when the packing is to be made effective, the keys on one side are withdrawn and there, with the aid of a common actuator, all of the pins are moved axially to remove the large diameters thereof from the keyhole slots and permit the garter springs to collapse the segments upon the propeller shaft. After the emergency, built-in threaded jacks are available to withdraw the segments from the shaft and rethread the large diameters of the pins into the larger ends of the keyhole slots.

Referring now to the drawings for a detailed description of the invention. FIG. 2 shows in dotted lines a fragment of a bulkhead 10 having an opening formed with a flanged casting 11 of circular form and having an inner circular opening 12 through which a ship's propeller shaft 13 extends. Although not shown, bulkhead 10 is normally at a right angle with the horizon line, i.e., it is vertical, and the axis of casting 11 coincides with the axis of the ship's propeller which may be inclined 7° to the horizon line. Casting 11 is preferably secured to bulkhead 10 by a weld which is water-tight.

To the right hand flat face 14 of casting 11 is secured a seal housing 15 which is formed with an outwardly extending flange 16 overlying surface 14 and by which housing 15 is secured with the use of bolts 17 (FIG. 1). A gasket 18 between flange 16 and surface 14 assures a water-tight seal therebetween.

The seal housing proper is a cylinder 18 the ends of which are partially closed off by gland plates 19 and 20 each of which is appropriately sealed as at 21 and 22 with rubber rings disposed in annular cavities formed between the ends of housing 15 and the gland plates 19 and 20. The gland plates 19 and 20 have openings 23 and 24, respectively, formed therein the diameter of which are larger than the diameter of propeller shaft 13 passing therethrough so that any runout of the shaft can be accommodated without danger of the shaft striking the gland plates 19 and 20.

The annular space 25 defined by housing 15, gland plates 19 and 20 and shaft 13 may be variously termed a seal chamber, or a stuffing box, and within this annular space is located the means for effecting a fluid-tight seal between shaft 13 and housing 15. Said means, in the form selected to illustrate this invention, is comprised of three identical sets of segmental packing 26, 27 and 28. The number of sets may vary as may the form of each set, but for the size of shaft and pressures involved as well as interchangeability and low inventory of parts, three identical sets are shown.

Referring now to FIGS. 3, 3A, 4 and 5, each set of segmental packing is composed of three identical metal segments 29, 30 and 31 of more than 120° so that the ends thereof overlap as shown at 32 and 33. The shape of a segment 29 is shown more clearly in FIG. 3 and the shape of an overlapping end is shown in perspective in FIG. 3A. Each metal segment has a continuous peripheral outer channel 34 and a continuous inner channel 35. Outer channel 34 has a curved bottom to retain a garter spring 36 or similar substantially endless resilient band. Inner channel 35 has a square bottom and is intended to receive a segment of packing 37 which for greatest efficiency is square in cross section. The composition of the packing is one designed to work well on steel or other material of the propeller shaft in a salt water and oil environment. A material having asbestos as the principal ingredient has been found to be satisfactory.

Inasmuch as packing 37 must move radially with its segment 29 and must resist peripheral movement in its groove under frictional forces, it is secured in place by pins 38 which pass through the sides of the groove and through the packing therein.

The ends of adjacent segments are made to overlap so that the ends of the packing in each segment may also overlap in accordance with good packing practice. Thus, as shown in FIG. 3A, a sector 39 of segment 30 is cut half away as is also the acjacent sector of segment 29 (FIG. 3). The garter spring groove 34 and the packing groove 35 are also cut half away. Packing 37 will thus have its ends cut away at each segment in a manner to provide the desired overlap therein for maximum sealing efficiency.

Thus, when all three packing segments in a set are held in contact with the shaft, a continuous ring of packing is presented to block any water or other fluid tending to leak axially along the shaft. Any water escaping past the first set will be blocked by the second and third sets, it being understood as stated above that all sets are identical. Escape of water behind or around the segments is prevent by o-rings 40 and 41 of elastomeric material retained in circular grooves 42 and 43 formed in the inner sides of gland plates 19 and 20, respectively.

The seal of this invention and in particular its three sets of packing are normally held out of contact with the shaft as shown in FIG. 2 to avoid unnecessary wear of the packing. The means by which this is accomplished is shown in FIGS. 1 and 2 to which reference is now made.

Each metal segment 29 has a keyhole slot 44 formed in a strut 45 (FIG. 3) located approximately midway between the ends of a segment, the segments having openings 46, 47 formed axially therethrough to lighten each segment as well as to reduce its cost. Each keyhole slot has an enlarged round radially inner end 48 connnected to a radially disposed narrower slot 49. Said narrower slot 49, however, has a central region 50 which is of the same circumferential extent as the diameter of the large round end 48. The purpose of this construction will be made clear hereinafter.

The keyhole slots of adjacent segments of each set of segments are mounted in housing 15 to be in perfect axial alignment with one another. Thus, all of the large round ends are aligned, making it possible to pass a control pin 51 through all of the aligned slots. Said control pin 51 also passes through an opening 52 in gland plate 20 and through an opening 53 in gland plate 19. Control pin 51 is essentially of the diameter shown at opening 52 in gland plate 20, which is slightly less than the width of the slot narrow portion 49 (FIG. 5) in keyhole slot. Thus, any portion of control pin 51 having that diameter can pass through any portion of keyhole slot 44.

There are two lands 54 and 55 formed on pin 51, said lands being axially spaced from one another to bridge adjacent keyhole slots. The diameter of the lands is greater than the width of the narrow portions 54 of the keyhole slots so that when pin 51 occupies the position shown in FIG. 2, each land supports one outside segment and the middle segment and obstructs movement of the segment radially inward toward shaft 13. Should pin 51 be moved axially to the left, however, as viewed in FIG. 2, land 55 will leave the left hand narrow portion of the keyhole slot of segment 29 and allow that segment to move toward shaft 13 under the action of garter spring 36. The remaining segments axially adjacent segment 29 will still be supported by the lands until said lands move axially past the narrow portions of the keyhole slots and axially adjacent segments, whereupon the latter too will move toward shaft 13.

If control pin 51 had been initially moved to the right, as viewed in FIG. 2, the same result would have obtained except that the left hand segment (FIG. 2) would have collapsed first.

Thus, by moving control pins 51 axially from the position shown in FIG. 2 from either side of housing 15, the segments can be released to engage and seal the shaft 13. To prevent an inadvertent movement of control pin 51, a lock pin 56 is provided which passes through an opening 57 in pin 51 adjacent gland plate 20. Another lock pin 58 on the opposite side of housing 15 passes through an opening 59 in that side of control pin 51. Pin 51 is thus locked against axial movement in either direction.

To release control pin 51 from either side of housing 15, the lock pin on that side is pulled out and the control pin is then free to move into the housing 15. The fact that the opposite lock pin is still in place does not hinder the movement of control pin 51. To prevent loss of lock pins 56 or 58, each pin is attached to a chain 60 which is long enough to permit movement of a control pin as required.

Since there are three segments for each ring of packing, there are three control pins per ring and each control pin has its two lock pins. The operation of the lock pins does not require any accurate manipulation of said lock pins, since each lock pin can be readily reached through its chain 60. The control pins 51 are made simultaneously and easily available for manipulation by a common control ring 61 which has counterbores 62 to receive the ends 63 of control pins 51 to which said ends 63 may be secured by studs 64 in said ends 63 extending through control ring 61, and a nuts 65. Ring 61, after being freed by the withdrawal of all of the lock pins 56, can be pushed in toward housing 15 from any point in its circumference and simultaneously operate all of the three pins 51.

After the hull in the flooded compartment has been repaired and the water has been removed from that compartment, the propeller shaft seal is no longer needed. The segmental packing may therefore be withdrawn from contact with the shaft by the following means:

In each keyhole slot 44 is placed a jack pin 66 (FIGS. 1, 6 and 7), the width of which is slightly less than the width of the narrow portion of slot 44. The jack pin is formed with an enlarged end 67, the sides 68 and 69 of which are machined flat and parallel to fit into a radially disposed groove 70 formed in gland plate 20 and opening upon keyhole slot 44. A stud 71 is threaded into an opening in enlarged end 67 and secured against further rotation therein by a set screw 72. Stud 71 extends loosely through an opening 73 in seal housing 15 and also through an unthreaded opening 74 a lug 75 secured to housing 15 by a screw 76 in spaced relation to the side 77 of seal housing 15. In the space between lug 75 and side 77 is retained a nut 78 riding on a washer 79 on side 77 and threaded on the upper end of stud 71.

Under normal, non-emergency conditions, jack pin 66 occupies the position in slot 44 shown in FIG. 1, wherein it is in its radially innermost position. After an emergency operation of the seal, all packing segments will have been released by control pins 51 and will be engaged with propeller shaft 13, i.e., the segments will have moved radially toward jack pins 66. To restore the segments to their inoperative positions, each nut 78 is tuned to advance the nut along stud 71 toward jack pin 66, thereby moving the stud 71 and jack pin 66 radially outwardly of housing 16 until said pin contacts the outer ends of keyhole slots 44. Thereafter, continued rotation of the nuts causes the segments to be moved outward against the action of garter springs 36 until the enlarged ends 48 of the keyhole slots are aligned with the lands 54 and 55 on pins 51. At this point the pins are slid in the direction to bring the lands into the keyhole slots to the position shown in FIG. 2 wherein said lands each supports adjacent segments 29.

After the control pin 51 is in its segment-supporting position, the jack pin is returned to the radial inner position shown in FIG. 2, leaving the segments controlled thereby again in cocked position in readiness for the next emergency. It is understood that a jack pin and associated stud, nut and apertured lug are provided for each segment of the packing, and that all segments must be retracted before the seal is ready for the next emergency.

It is understood that a duplicate control ring 61a is secured to all of the opposite ends 80 of control pins 51 which are accessible on the opposite side of bulkhead 10 and that release of the packing segments is accomplished on that side by pulling out all of the lock pins 58 by their chains 81 in the manner described with reference to control ring 61. Restoration of the segments 29 to their raised or cocked positions, however, is accomplished solely by the single set of jack pins 66 previously described, although, if desired, said pins could be modified to be operated from both sides.

In the initial assembly of the control pins 51 with the segments 29, 30 and 31, it is necessary to insert the pins 51 with their lands 54, 55 into the housing from the left hand side thereof as viewed in FIG. 2, opening 53 in gland plate 19 being enlarged to pass lands 54, 55 therethrough. Suitable O ring seals 82, 83 are provided between the gland plates and the ends of the control pins to prevent excessive leakage of water from the flooded side of the seal to the other.

It is apparent that the axial dimension of seal chamber 25 must be such as not to hinder the movement of the packing segments, i.e., not to bind said segments in the housing when the gland plates 19 and 20 are tightened against cylinder 18. To allow for manufacturing errors which might produce such binding conditions, provision is made for inserting one or more shims 84 between gland plate 19 and cylinder 18.

I claim:

1. A packing assembly for emergency use around a shaft, said packing assembly comprising a plurality of overlapping packing segments forming a closed ring and a garter spring holding said segments together against a shaft, a housing surrounding the packing and secured to a wall through which the shaft passes, latch means for holding the segments out of contact with the shaft, control means for said latch means, and means accessible from either side of the housing for moving the latch means to release the packing for engagement with said shaft.

2. A packing assembly as defined in claim 1, and means for raising the packing segments off the shaft against the action of said garter spring to permit the latch means to be returned axially to its packing latching position.

3. A packing assembly as defined in claim 1, said latch means comprising a control pin, said packing segments each comprising a metal holder of segmental form having a groove therein facing radially inwardly of the segment, packing in the groove, said holder having a keyhole slot radially disposed therein and said control pin extending through the wide portion of the keyhole slot to support the segmental holder off the shaft.

4. A packing assembly as defined in claim 3, said segment having a radially disposed area adjacent said keyhole slot of a dimension equal to the dimension of the wide portion of the keyhole slot, and said control pin havng a land thereon of substantially the same size as the wide portion of the slot, whereby axial movement of said control pin relative to a segment aligns the land with the said radially disposed area to remove support for said segment and allow it to move radially relative to said control pin.

5. A packing assembly as defined in claim 1, there being one control means for each segment of the packing, and common means connecting each control means to permit operation of all of said latch means substantially simultaneously.

6. A packing assembly as defined in claim 5, said common means comprising a ring secured to each of said control means.

7. A packing assembly as defined in claim 1, a gland plate on each side of the housing, said control means passing through both gland plates, and stop means on the control means at each gland plate preventing axial movement of the latch means into said housing to release the segments.

8. A packing assembly as defined in claim 7, said stop means comprising a stop pin, said control means having a hole to receive a portion of said stop pin such that said stop pin extends out of said control means and abuts against said gland plate.

9. A packing as defined in claim 8, and flexible means secured to each stop pin and to a gland plate for manipulating said stop pin.

10. A packing as described in claim 3, said metal holders having overlapping ends, and said packing in the grooves extending into the overlapping ends of the metal holders and itself having overlapping ends.

11. A packing as disclosed in claim 7, and jack means in the housing and guided by one of said gland plates for moving a packing segment away from the shaft against the action of the garter spring.

12. A packing as described in claim 11, said jack means comprising a jack pin extending into a keyhole slot, screw means secured to the jack pin, and rotatable means axially fixed to the housing for engaging the screw means and moving said screw means axially thereof.

13. A packing assembly as defined in claim 1, gland plates secured to the housing on either side of the packing segments and sealed with respect thereto, said packing segments when engaging said shaft being radially movable relative to said gland plates to accommodate run-out of said shaft.

14. A packing assembly as defined in claim 1 and comprising additional closed rings of overlapping packing segments disposed around the shaft adjacent to one another and to said first-mentioned closed ring, said additional closed rings being substantially identical to said firstmentioned closed ring, and said latch means being common to all said closed rings to operate all of said closed rings simultaneously.

* * * * *